July 29, 1969  W. H. JOHNSTON, JR  3,457,923
APPARATUS AND METHODS FOR TREATING ANIMALS
Filed Aug. 1, 1966  3 Sheets-Sheet 1
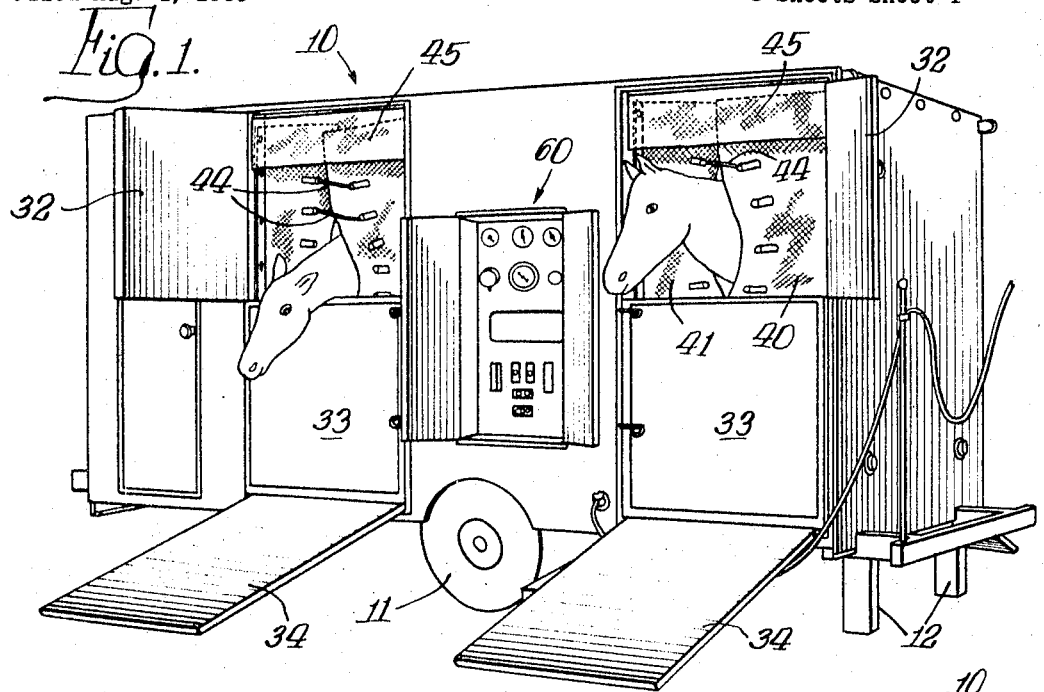
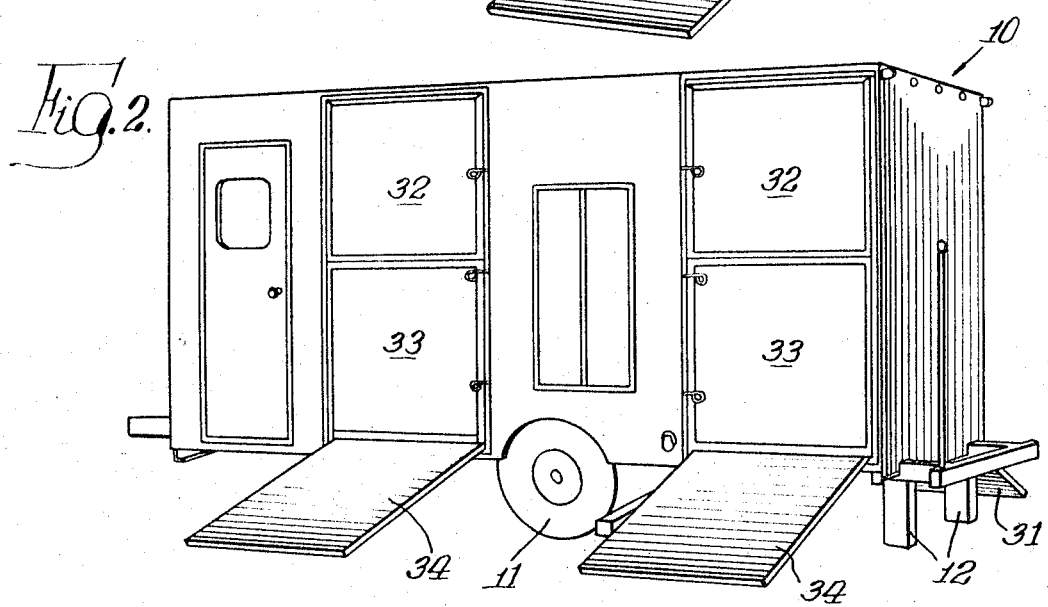
Inventor:—
William H. Johnston, Jr.,
By Hofgren, Wegner, Allen,
Stellman & McCord Attys.

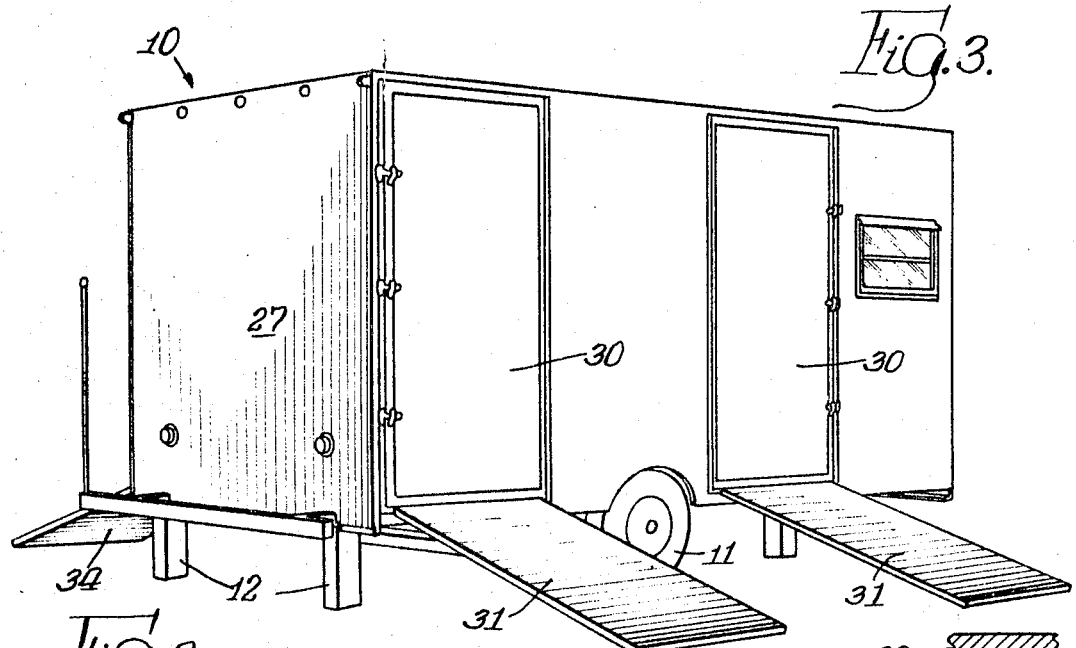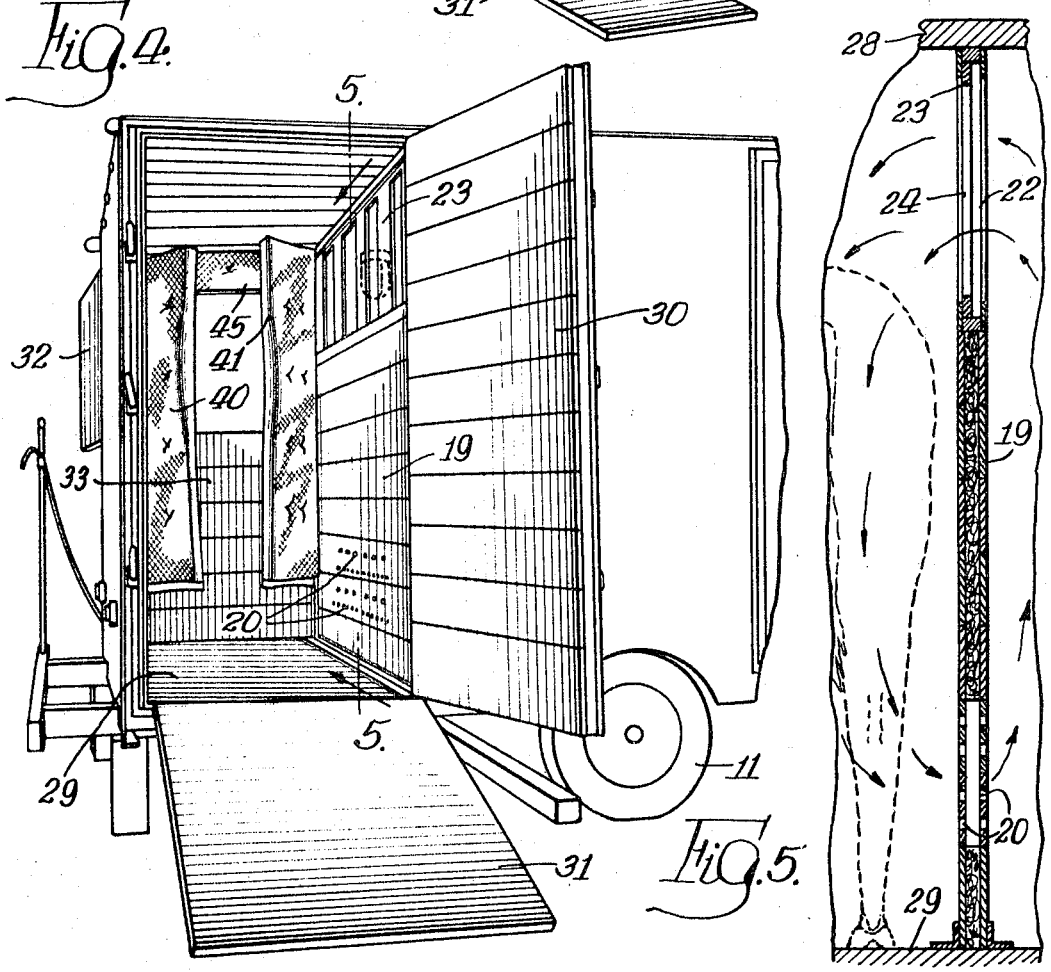

July 29, 1969 W. H. JOHNSTON, JR 3,457,923
APPARATUS AND METHODS FOR TREATING ANIMALS
Filed Aug. 1, 1966 3 Sheets-Sheet 3
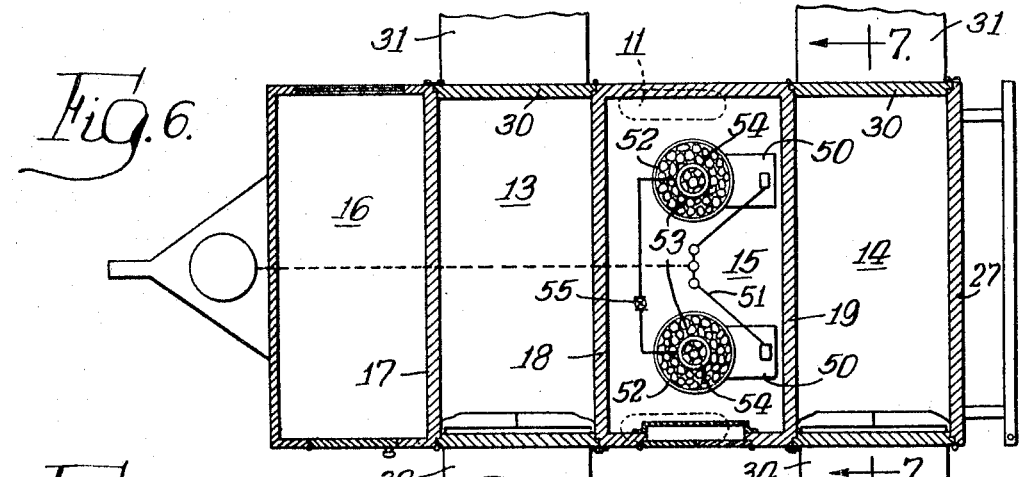
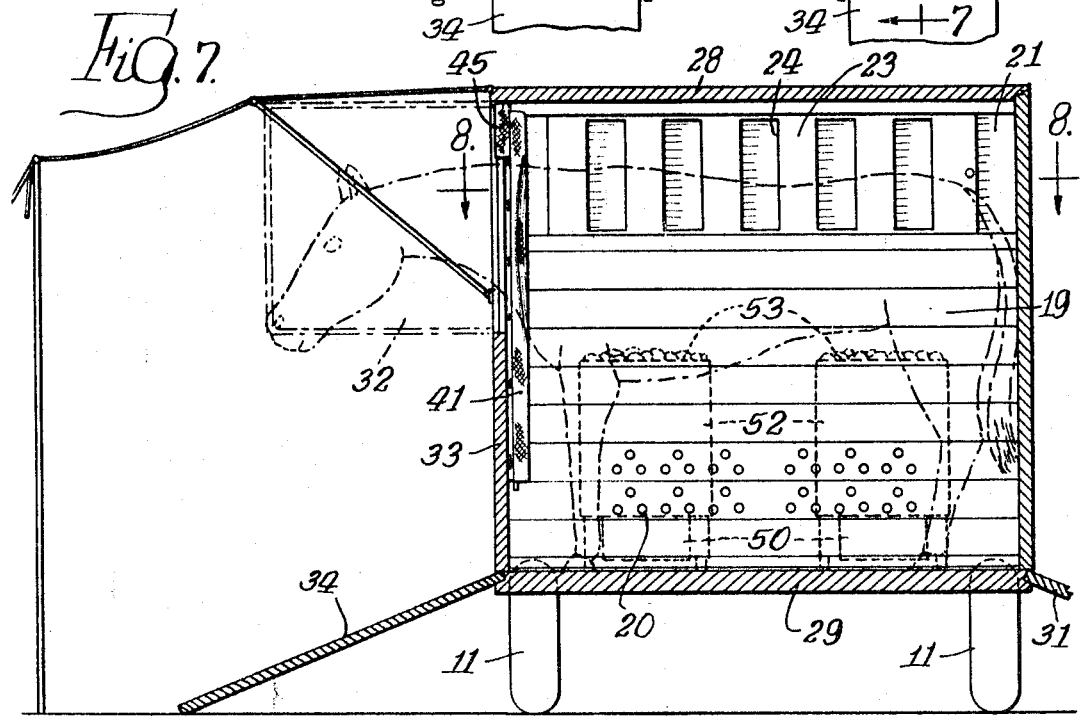
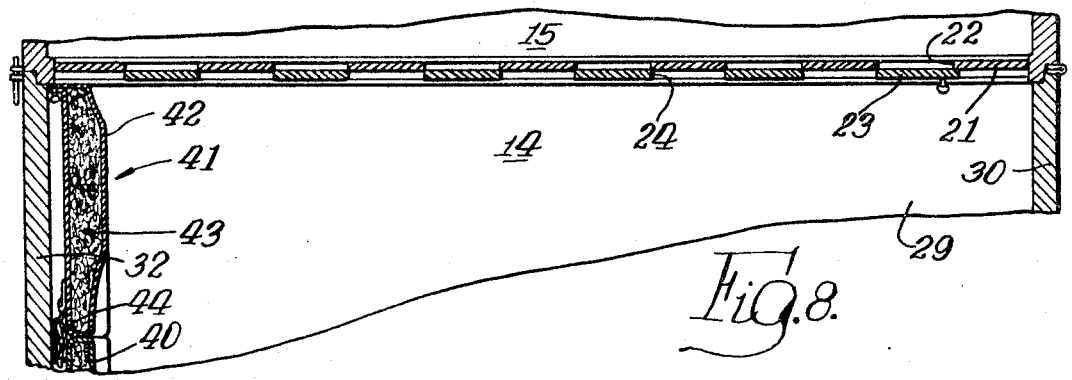

United States Patent Office 3,457,923
Patented July 29, 1969

3,457,923
APPARATUS AND METHODS FOR TREATING ANIMALS
William H. Johnston, Jr., Hinsdale, Ill. (% Racing Research Corp., 3301 S. Laramie Ave., Chicago, Ill. 60650)
Filed Aug. 1, 1966, Ser. No. 569,448
Int. Cl. A61h 33/06
U.S. Cl. 128—374                                    6 Claims

ABSTRACT OF THE DISCLOSURE

There is disclosed an apparatus and method for treating animals, including a chamber in which the animal may be placed, and an adjoining chamber wherein heat is generated together with means for transferring heat between the chambers so as to maintain a temperature gradient between the top and bottom of the chamber in which the animal may be placed. There is also shown a method for applying heat therapy to horses, wherein the upper portion of the body of the animal is subjected to relatively high temperatures while the lower portions thereof are subjected to lower temperature.

---

This invention relates to treating apparatus and methods and more particularly to apparatus and methods for administering heat therapy to animals.

It is a principal object of the present invention to produce new and improved methods and apparatus for treating animals of the character described.

The administration of therapeutic treatment to animals is a rapidly advancing science, particularly in the field of administration of drugs of various sorts to ill or ailing animals. Less advance has been made in the field of physical therapy as applied to animals, and in most instances the application of heat treatments, i.e., heat and cold, has been done in a somewhat haphazard manner, including the application of hot towels, ice bags, and the like.

Domestic animals, including horses, are subject to many of the ills which also afflict humans, such as rheumatism, muscle soreness, joint pain, etc., and aside from the application of hot or cold dressings, ointments, and the like, little progress has been made in providing scientifically controllable applications of thermal therapeutics in an attempt to improve, cure, or ease the pain, discomfort and stiffness which accompany such ailments.

According to the present invention, however, there is provided a thermal therapeutic apparatus and methods of using the same which enable the user to apply carefully controlled heat to selected areas of an animal. The apparatus and methods are particularly applicable to the treatment of race horses wherein the existence of muscle or joint stiffness may and often does mean the difference between an animal which is successful in racing and one which is unsuccessful.

In the treatment of race horses, I have found it to be tightly desirable to subject the upper portion of the horse to relatively high temperatures while maintaining the lower portion of the horse, i.e., the lower portion of the legs, at substantially cooler temperatures inasmuch as heating the entire body of the horse appears to have an adverse effect. The methods developed and the apparatus provided for employing the same are particularly adaptable to providing temperature differentials between various areas of the horse's body in order that those areas which benefit from heat treatment receive the same while the other areas which are apt to be damaged by the application of excessive heat are kept at lower temperatures.

Other objects and advantages of the present invention will be readily apparent from the following description and drawings, in which:

FIG. 1 is a perspective view of the front portion of an apparatus embodying the invention;

FIG. 2 is a view like FIG. 1 but with certain portions of the apparatus in changed position;

FIG. 3 is a perspective view of the rear of the apparatus shown in FIG. 1;

FIG. 4 is an enlarged view of a portion of the rear of the apparatus with certain parts in different position;

FIG. 5 is a sectional view taken along line 5—5 of FIG. 4;

FIG. 6 is a top plan view of the apparatus shown in FIG. 1 with the roof portion broken away for clarity of illustration;

FIG. 7 is a vertical section taken along line 7—7 of FIG. 6; and

FIG. 8 is a horizontal section taken along line 8—8 of FIG. 7.

While this invention is susceptible of embodiment in many different forms, there is shown in the drawings and will herein be described in detail a specific embodiment, with the understanding that the present disclosure is to be considered as an exemplification of the principles of the invention and is not intended to limit the invention to the embodiment illustrated. The scope of the invention will be pointed out in the appended claims.

Referring now to the drawings, the treatment apparatus of the present invention is shown as embodied in a trailer 10 having the normal trailer wheels 11 so that the same may be readily transported from one place of use to another. Normal braces 12 are provided to hold the trailer in horizontal position during its use as a treatment center. Obviously, the device may be constructed on a permanent site in which event the mobile features may be eliminated.

Referring to FIG. 6, it will be seen that the trailer 10 includes a first treating chamber 13, a second treating chamber 14 which is a duplicate of the first chamber, with the two chambers being seperated by a heat generating chamber 15 positioned therebetween. In the excess space provided in the trailer 10 there may be located a small office 16 where records of treatment, etc. may be maintained.

The first treating chamber 13 is separated from the office 16 by an insulating wall 17 and from the heat generating chamber 15 by an insulating wall 18. An additional insulating wall 19 is provided between the second treating chamber 14 and the chamber 15.

Each of the walls 18 and 19 is provided near the bottom with a number of holes or openings 20 providing communication between the lower portion of each treating chamber and the lower portion of the heat generating chamber 15. Adjacent the upper portion of each of the walls 18 and 19 there is provided a fixed wall 21 having a plurality of slots 22 therein and a sliding wall 23 having a plurality of slots 24 therein. With this arrangement, the sliding wall 23 may be moved relative to the fixed wall 21 from a first position in which the slots 22 coincide with the slots 24 so as to provide communication between the upper part of each treating chamber and the adjoining heat generating chamber 15. The areas of the slot openings may be varied from fully opened to fully closed, as well as intermediate positions, and of course, if but one animal is being treated, only one treating chamber would be utilized and the sliding wall in the other chamber would be moved to a position closing the slots.

The end wall 27 of the trailer is, of course, insulated as is the top 28. The floor 29 is also insulated but to a substantially lesser extent so as to provide for more heat loss through the floor, a factor aiding in the maintenance of temperature gradient or temperature difference between the top and bottom of each treating chamber.

Entrance to each treating chamber is provided through a rear door 30 which is insulated as illustrated, and ramps 31 leading from the ground into the treating chamber. A pair of double doors 32 and 33 are provided at the front of each treating chamber and ramps 34 lead therefrom so that the horse may be led directly into and out of each treating chamber with facility.

The front of each treating chamber is provided with a flexible closure comprising two portions 40 and 41 hinged along the vertical side edges. The flexible closures are provided with fabric covers 42 enclosing insulating material 43, with the arrangement being such that the members 40 and 41 may be closed about the neck of a horse as illustrated in FIG. 1 and secured in closing position by cord ties 44. A top flap or hinge cover 45 is provided along the top area of each of the flexible closures so as to seal off the upper portion against loss of hot air.

As can be seen in FIG. 1, the horse's head is outside of the treating chamber and thus the horse is breathing ambient air and the head and neck portions are not subject to the temperatures existing inside the treating chamber.

In the heat generating chamber 15 there is provided a pair of heat sources, namely, gas burners 50 provided with gas (normally bottled gas) through lines 51. Hot air delivered from the gas burners is directed into a pair of pots 52 filled at least partially with stones 53 over which water may be sprayed if desired from sprays 54 controlled by valve 55, the valve being reachable by the attendant in charge by reaching through the slots provided in the upper portion of the walls 18 and 19. By utilization of the water sprays, the humidity within the treating chambers may be maintained at the desired level.

An exterior control panel 60 is provided with instruments for indicating the temperatures within each of the treating chambers, the humidity therein, and timers and temperature regulators may also be provided if desired.

The manner in which the apparatus functions is believed to be clear. With the rear door 30 open, a horse may be led into the treatment chamber and the door closed behind it. Normally, the lower front door 33 will be kept in closed position and after the horse's head has emerged thereabove, the two flexible closures 41 and 42 are brought together encircling the neck of the horse and secured together by ties 44. With the gas burners 50 operating, hot air rises to the top of the heat generating chamber 15 and enters into one or both of the treating chambers through the slots in the upper walls therebetween. Cool air returns to the heat generating chamber through the lower openings 20 and the normal convective movement of hot air will provide a temperature differential between the top and bottom of each treating chamber, with the differential being augmented by the heat-transfer ability of the floor which is in excess of the heat-treansfer ability of the other boundaries of each treating chamber.

Exemplary of temperatures which may be utilized in the treatment of horses, there is set forth below in chart form illustrative temperatures and temperature differentials existing in the treating chambers. Point A is approximately 1 inch below the ceiling or top wall of each treating chamber, this is about 83 inches above the floor. Point B is 66 in. above the floor, and is the area where the top of the back of the horse, its withers and kidney areas are located. Point C is 51 in. from the floor and includes the front and hind quarters of the horse—possibly the most important areas of treatment where lameness or stiffness is encountered. Point D is 36 in. from the floor and is the elbow area of the horse. Point E is 19 in. from the floor at the location of the knee or hock. Point F is approximately 4 in. from the floor.

[In °F.]

| Point A | Point B | Point C | Point D | Point E | Point F |
|---------|---------|---------|---------|---------|---------|
| 170 | 160 | 150 | 130 | 115 | 110 |
| 180 | 170 | 160 | 140 | 120 | 111 |
| 190 | 180 | 170 | 150 | 125 | 112 |
| 200 | 190 | 175 | 155 | 130 | 113 |
| 205 | 195 | 180 | 160 | 135 | 114 |
| 210 | 200 | 185 | 165 | 140 | 115 |
| 215 | 205 | 195 | 170 | 145 | 117 |
| 220 | 210 | 200 | 175 | 150 | 118 |
| 225 | 215 | 205 | 180 | 155 | 119 |
| 230 | 220 | 210 | 185 | 160 | 120 |

From the foregoing it can be seen that the temperature differential between points A and F may vary from 60° F. to 110° F. The normal treatment time is from 15 to 30 minutes, depending upon the condition of the horse, the problem to be corrected, etc. Humidity may be increased or decreased by spraying water onto the heated stones.

While the apparatus and methods set forth above have been directed primarily to the treatment of ailments of horses, the heat treatment may also be used before a horse race in order to provide a "warm-up" wherein little or no muscular activity is involved as contrasted to the normal warm-up wherein the horses are run considerable distances. Thus, the desired blood flow, and muscular and joint flexibility may be obtained without the expenditure of reserve energy and the latter may be saved to be utilized by the horse in running the ensuing race.

I claim:

1. Apparatus for treating animals comprising, a treating chamber having a top and side walls of low thermal conductivity and a floor of higher thermal conductivity, a heat generating chamber, means providing thermal communication between the heat generating chamber and the treating chamber, a flexible closure at one end of the treating chamber adapted to be engaged, about the neck of an animal to be treated to permit the head of said animal to extend outwardly of the treating chamber while sealing said end, said thermal communication between said chambers providing means arranged to establish a temperature gradient between the top and bottom of said heat treating chamber whereby to expose the upper portion of an animal in said treating chamber to an atmosphere having a temperature higher than the atmosphere surrounding the lower portion of the animal.

2. Apparatus of the character described in claim 2 in which said flexible closure comprises a pair of hingedly mounted fabric-faced panels of insulating material together with means adapted to secure the same in substantial sealing engagement with the neck of the animal.

3. Apparatus for treating an animal comprising a closure having an insulated top wall and insulated side, front and rear walls, and a bottom wall, a vertically upstanding wall within the closure to divide the same into a heat generating chamber and a treating chamber, means in the heat generating chamber for generating an ascending column of hot air, said wall having a plurality of opening in the top and bottom thereof provided for convective movement of hot air into the top of said treating chamber and cooler air from the bottom of said treating chamber into the lower portion of the heat generating chamber, means for regulating the size of the openings in the upper portion of said wall to regulate said convective flow, said flow of hot air providing a substantial temperature gradient of at least 60° F. between the top and bottom of said treating chamber, a flexible closure at one end of said chamber, said flexible closure being of insulating material and being adapted to be secured around the neck of an animal standing in the treating chamber with its head outside of said chamber to provide a seal between the interior and exterior of said chamber, and means for adding moisture to the atmosphere within said treating chamber.

4. Apparatus for treating an animal comprising a closure having an insulated top wall, and insulated side, front and rear walls, and a bottom wall, a vertically upstanding wall within the closure to divide the same into a heat generating chamber and a treating chamber, means in the heat generating chamber for generating an ascending column of hot air, said wall having a plurality of openings in the top and bottom thereof provided for convective movement of hot air into the top of said treating chamber and cooler air from the bottom of said treating chamber into the lower portion of the heat generating chamber, means for regulating the size of the openings in the upper portion of said wall to regulate said convective flow, said flow of hot air providing a substantial temperature gradient of at least 60° F. between the top and bottom of said treating chamber, a flexible closure at one end of said chamber, said flexible closure comprising a pair of hingedly mounted fabric-faced panels of insulating material, means adapted to secure the panels around the neck of an animal standing in the treating chamber with its head outside of said chamber to provide a seal between the interior and exterior of said chamber, and a hingedly mounted flexible panel extending across the top of the treating chamber at the location of said flexible closure.

5. The method of treating a horse which comprises subjecting the upper portion of the horse to temperatures from 170° F. to 230° F. while maintaining the lower portions of the horse at temperatures at least 60° F. lower than said first mentioned temperatures, and maintaining the horse under said conditions for between 15 and 30 minutes.

6. The method of treating a horse which comprises placing a horse with its body in an enclosure and with its head extending outwardly from said enclosure, providing a seal around the neck of the horse to seal the interior of the enclosure and then maintaining the horse within said enclosure for a period from 15 to 30 minutes while maintaining the temperature in the portion of the enclosure encompassing the upper portion of the horse at temperatures between 170° F. and 230° F. while maintaining the portion of the enclosure encompassing the lower extremities of the horse at temperatures of 120° F. or less.

References Cited
UNITED STATES PATENTS

| | | | |
|---|---|---|---|
| 301,637 | 7/1884 | Somerville et al. | 119—1 |
| 2,814,297 | 11/1957 | Stewart | 128—374 |

WILLIAM E. KAMM, Primary Examiner

U.S. Cl X.R.

4—164